US010928484B2

(12) United States Patent
Gao et al.

(10) Patent No.: US 10,928,484 B2
(45) Date of Patent: Feb. 23, 2021

(54) DIRECTIONAL RADAR TRANSMITTING AND RECEIVING SYSTEM

(71) Applicant: Gardenia Industrial Limited, Wong Chuck Hang (HK)

(72) Inventors: Bo Gao, Zhong Shan (CN); Xiao Xiong Liu, Zhong Shan (CN)

(73) Assignee: GARDENIA INDUSTRIAL LIMITED, Wong Chuk Hang (HK)

(*) Notice: Subject to any disclaimer, the term of this patent is extended or adjusted under 35 U.S.C. 154(b) by 229 days.

(21) Appl. No.: 16/119,644

(22) Filed: Aug. 31, 2018

(65) Prior Publication Data

US 2019/0072642 A1 Mar. 7, 2019

(30) Foreign Application Priority Data

Sep. 1, 2017 (CN) .......................... 201721111845.3
Sep. 25, 2017 (CN) .......................... 201710875131.8

(51) Int. Cl.
*G01S 7/03* (2006.01)
*G01S 13/56* (2006.01)
*H01Q 1/24* (2006.01)
*H01Q 1/38* (2006.01)
*H01Q 15/14* (2006.01)

(52) U.S. Cl.
CPC .............. *G01S 7/032* (2013.01); *G01S 13/56* (2013.01); *H01Q 1/247* (2013.01); *H01Q 1/38* (2013.01); *H01Q 15/14* (2013.01)

(58) Field of Classification Search
CPC .......... G01S 13/56; G01S 7/032; G01S 7/021; G01S 7/023; G01S 7/282; G01S 7/285; G01S 7/36; H01Q 15/14; H01Q 1/247; H01Q 1/38
See application file for complete search history.

(56) References Cited

U.S. PATENT DOCUMENTS

| 5,459,387 | A * | 10/1995 | Cwejman ................ H02P 23/08 318/805 |
| 5,739,643 | A * | 4/1998 | Usui ...................... H05B 41/30 315/241 S |
| 7,800,396 | B2 * | 9/2010 | Yamamoto ....... G01R 31/31708 326/9 |
| 2017/0365163 | A1 * | 12/2017 | MacKenzie ............. G01S 13/56 |
| 2018/0139698 | A1 * | 5/2018 | Quinlan ................... H04Q 9/00 |

* cited by examiner

*Primary Examiner* — Timothy X Pham
(74) *Attorney, Agent, or Firm* — Lewis Roca Rothgerber Christie LLP

(57) ABSTRACT

According to one embodiment of the present invention, a directional radar transmitting and receiving system includes: a main control chip is configured to determine whether a pulse wave signal output by a sensor circuit board meets a triggering condition wherein each of a plurality of evaluation processes is satisfied, the evaluation processes including: a first evaluation process including: determining whether a width and an amplitude of the pulse wave signal meets a threshold amplitude; and a second evaluation process including: comparing a shape of the pulse wave signal output by the sensor circuit board with a pre-stored default triggering signal shape; and determining that the second evaluation process is satisfied when the shape of the pulse wave signal matches the pre-stored default triggering signal shape.

11 Claims, 15 Drawing Sheets

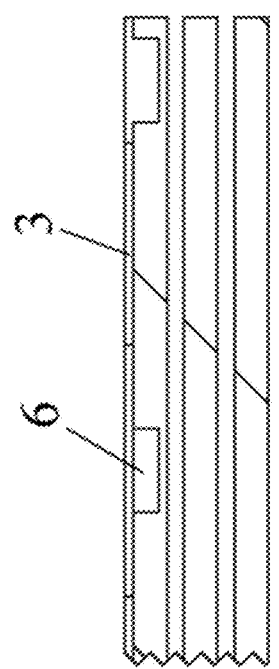
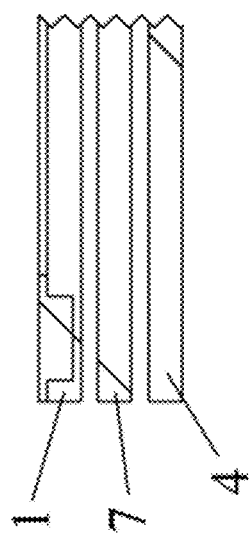
Figure 3

Figure 12 — Pre-stored default triggering signal shape

DIRECTIONAL RADAR TRANSMITTING AND RECEIVING SYSTEM

CROSS-REFERENCE TO RELATED APPLICATION(S)

This application claims priority to Chinese Utility Model Patent Application No. 201721111845.3, filed on Sep. 1, 2017 in the State Intellectual Property Office of the People's Republic of China and Chinese Patent Application No. 201710875131.8, filed on Sep. 25, 2017 in the State Intellectual Property Office of the People's Republic of China, the entire disclosures of which are incorporated by reference herein.

BACKGROUND OF THE INVENTION

1. Field

Aspects of embodiments of the present invention relate to systems and methods for controlling electrical appliances

2. Related Art

Conventional radar transmitting and receiving devices utilize non-directional or omnidirectional transmitting. However, conventional radar is susceptible to errors, such as false triggering and false operation, especially when using such conventional radar transmitting and receiving techniques are used to trigger a switch to control electrical appliances. For example, in the context of controlling lights, two adjacent rooms that were both equipped with switches that utilize non-directional or omnidirectional radar transmitting often both light up when someone enters just one of the rooms. This is because when the radar detector in one room senses the person entering the room and triggers the switch to activate the light, the radar detector in the next room would also be triggered falsely, thus activating the light in the next room, causing the room to be illuminated, even though there was no motion in the next room. Additionally, comparative directional radar transmitting and receiving devices are not sufficient robust when transmitting and receiving signals. (e.g., delayed response and excessive noise signal within in the circuit.) Thus, the use of the comparative available switch controls that utilize directional radar transmitting and receiving is limited due to these technical issues.

SUMMARY

Aspects of embodiments of the present invention relate to a directional radar transmitting and receiving system that is robust in transmitting and receiving signals, covering a wide area while avoiding or reducing interference.

A directional radar transmitting and receiving system includes: a sensor circuit board including: a microwave oscillator; a transmitting antenna; and a receiving antenna; and a main control board including: a signal amplifying circuit; a switch circuit; and a main control chip configured to control the switch circuit; wherein the microwave oscillator of the sensing board is configured to transmit a high-frequency microwave signal through the transmitting antenna, wherein the receiving antenna is configured to receive a frequency-shifted reflection of the high-frequency microwave signal transmitted through the transmitting antenna, wherein the microwave oscillator is configured to: apply frequency mixing and wave detection to the frequency-shifted reflection; generate a pulse wave signal; output the pulse wave signal to the signal amplifying circuit of the main control board; and output the pulse wave signal from the signal amplifying circuit to the main control chip, wherein the main control chip is configured to control the switch circuit, the switch circuit being configured to control a supply of power to one or more load appliances, and wherein the main control chip stores a software control module, the software control module configuring the main control chip to determine whether the pulse wave signal output by the sensor circuit board meets a triggering condition which each of a plurality of evaluation processes is satisfied, the evaluation processes including: a first evaluation process including: determining whether a width and an amplitude of the pulse wave signal meets a threshold amplitude; and a second evaluation process including: comparing a shape of the pulse wave signal output by the sensor circuit board with a pre-stored default triggering signal shape; and determining that the second evaluation process is satisfied when the shape of the pulse wave signal matches the pre-stored default triggering signal shape.

The evaluation processes may further include a third evaluation process including: determining whether the frequency of the pulse wave signal output by the sensor circuit board is similar to the frequency of a power supply configured to supply power to the sensor circuit board; and determining that the third evaluation process is met when the frequency of the pulse wave signal is dissimilar to the frequency of the power supply.

The evaluation processes may further include a fourth evaluation process including: determining whether a voltage value of the pulse wave signal output by the sensor circuit board exceeds a threshold voltage value.

In response to determining that the pulse wave signal output by the sensor circuit board meets the first evaluation process, the second evaluation process, the third evaluation process, and the fourth evaluation process, the main control chip may be configured to compute a fifth evaluation process including: receiving successive pulse wave signals during a time period; and determining that the fifth evaluation process is satisfied when at least a threshold number of the successive pulse wave signals received during the time period satisfy each of the evaluation processes, in response to determining that the fifth evaluation process is satisfied, the main control chip is con figured to control the switch circuit.

In one embodiment, the evaluation processes may be processed according to the following order: a. processing the fourth evaluation process; b. processing the third evaluation process; c. processing the first evaluation process; and d. processing the second evaluation process.

The directional radar transmitting and receiving system may further include a shielding board, configured to direct signals toward the sensor circuit board, wherein the transmitting antenna and the receiving antenna are a first face of the sensor circuit board, and wherein the shielding board faces a second face of the sensor circuit board, the second face being opposite the first face of the sensor circuit board.

The microwave oscillator may include: an RC oscillator circuit including a plurality of capacitors connected in parallel between a power supply and ground, a plurality of first ends of the capacitors connected to the power supply also being connected to a first end of the transmitting antenna; an input filter circuit connected between a base terminal of a transistor and the power supply; an output filter circuit connected to a first end of the receiving antenna; a transistor having: a collector terminal connected to a second end of the transmitting antenna; a base terminal connected to the power supply through the input filter circuit; and an emitter terminal connected to a second end of the receiving antenna; and an anti-coupling copper foil arranged on the sensor circuit board, the anti-coupling copper foil having a first end connected to the base terminal of the transistor and a second end floating.

The determining whether the frequency of the pulse wave signal is similar to the frequency of the power supply may include comparing the frequency of the pulse wave signal to a frequency of a mains power source connected to the power supply.

The sensor circuit board may have a plurality of first recesses distributed at intervals along at least one edge of a non-conductive substrate of the sensor circuit board, the transmitting antenna may include: a plurality of first copper pillars embedded in the first recesses; and a first copper wire electrically connecting the first copper pillars along the at least one edge of the non-conductive substrate of the sensor circuit board in the shape of a closed loop, the sensor circuit board may have a plurality of second recesses at a central portion of the non-conductive substrate of the sensor circuit board, and the receiving antenna may include: a plurality of second copper pillars embedded in the second recesses; and a second copper wire electrically connecting the second copper pillars, the second copper wire being located in a central portion of the non-conductive substrate of the sensor circuit board, the second copper wire being surrounded by the first copper wire.

The main control chip may also be connected to a configuration switch, and the main control chip is configured to set parameters of the evaluation processes according to a status of the configuration switch.

The parameters set according to the status of the configuration switch may include: a sensing distance of the sensor circuit board; a delay time to turn on the load appliances; and a light control mode.

BRIEF DESCRIPTION OF THE DRAWINGS

The accompanying drawings, together with the specification, illustrate exemplary embodiments of the present invention, and, together with the description, serve to explain the principles of the present invention.

FIG. 3 is a sectional view of the radar transmitting and receiving sensor circuit board of FIG. 1 along the line C-C;

DETAILED DESCRIPTION

Figure 1:
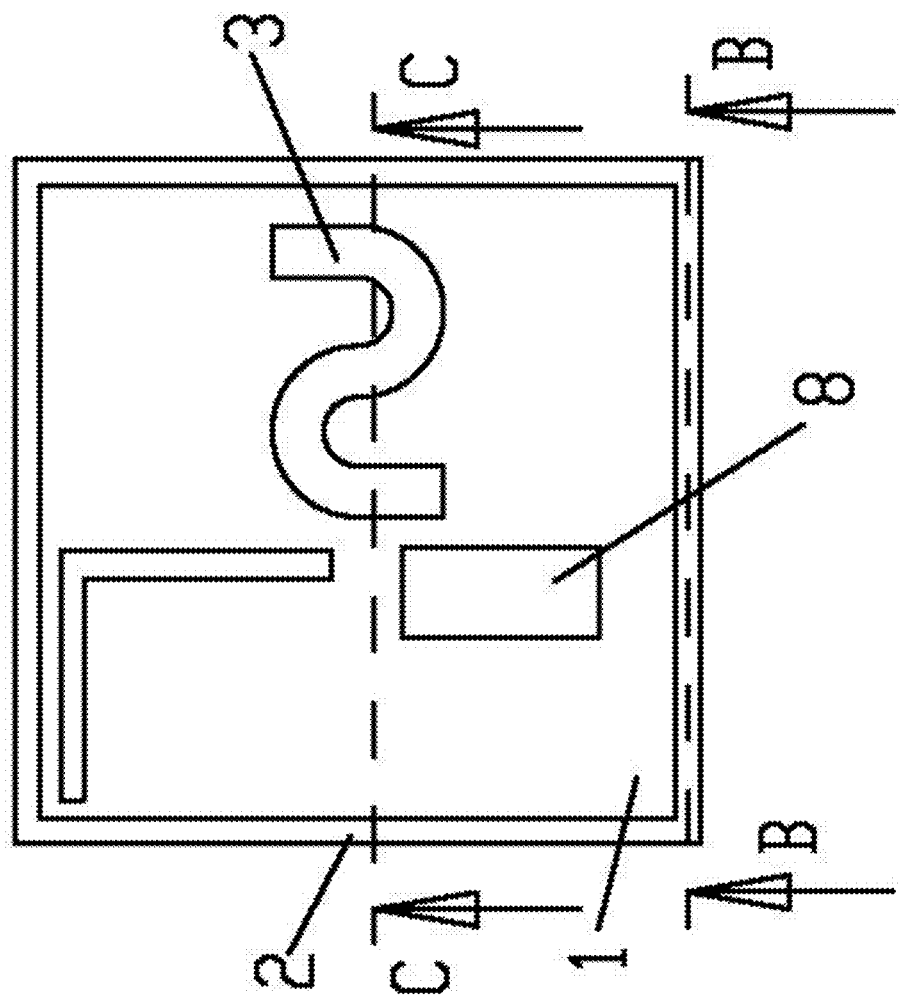
FIG. 1 is a plan view of a radar transmitting and receiving sensor circuit board according to one embodiment of the present invention.
Figure 2:
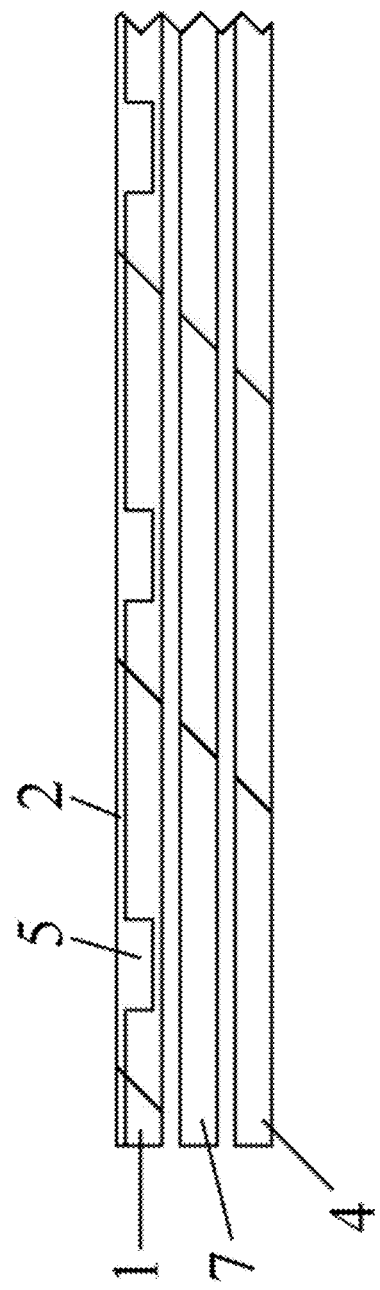
FIG. 2 is a sectional view of the radar transmitting and receiving sensor circuit board of FIG. 1 along the line B-B.
Figure 4:
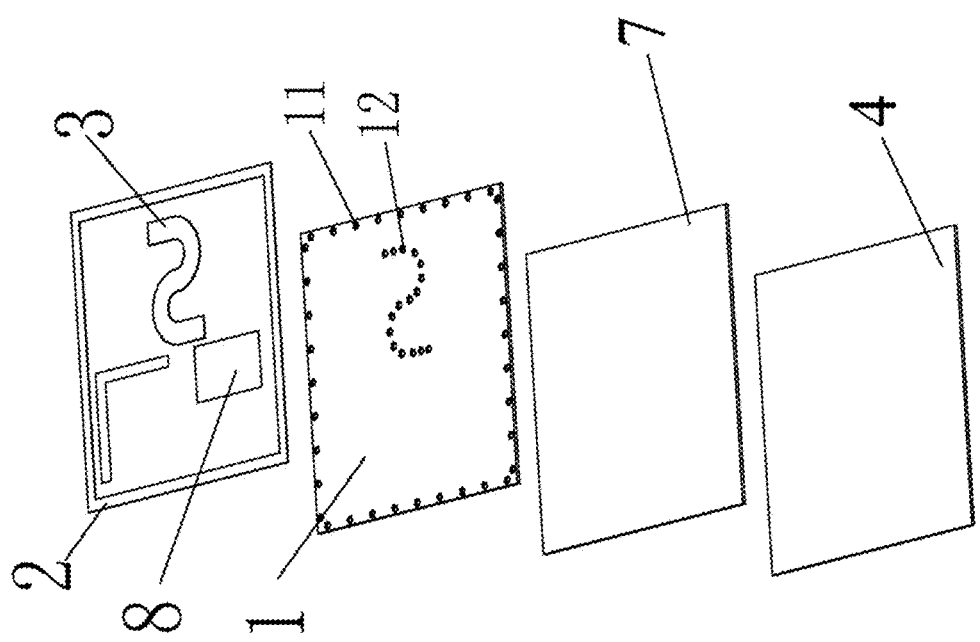
FIG. 4 is an exploded view of a radar transmitting and receiving sensor circuit board according to one embodiment of the present invention.
Figure 5:
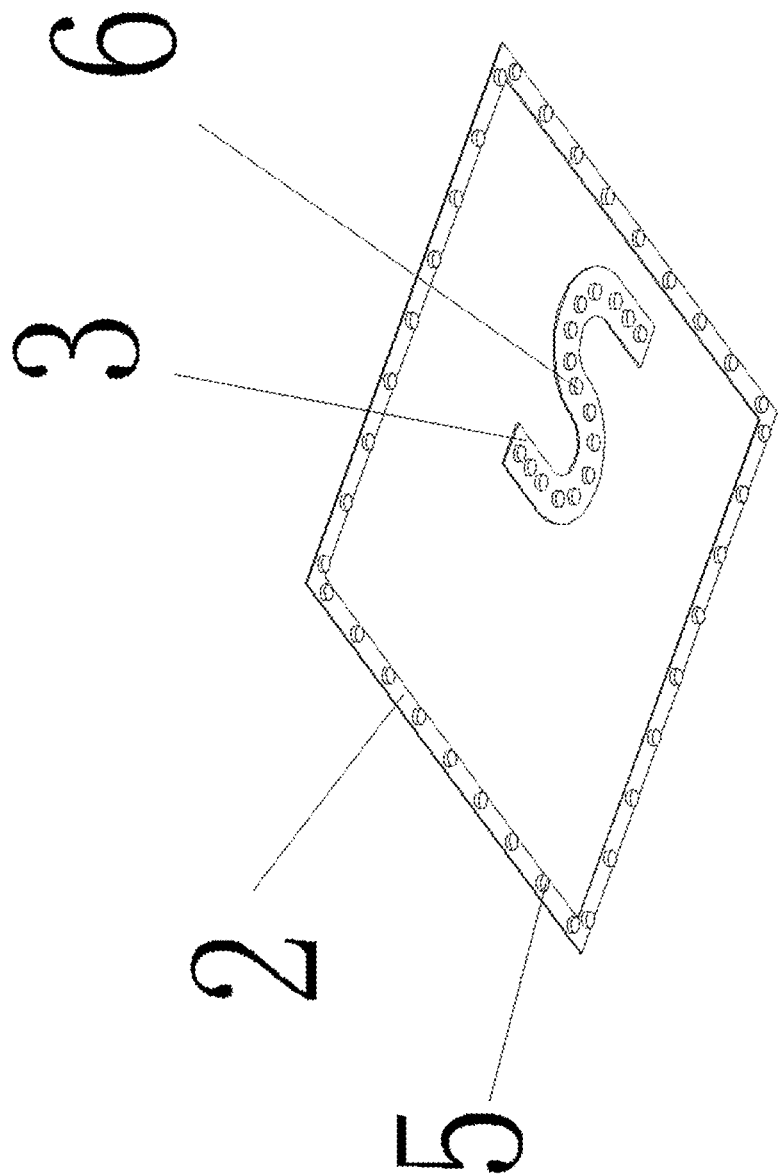
FIG. 5 is a perspective view of the transmitting antenna and receiving antenna portions of a radar transmitting and receiving sensor circuit board according to one embodiment of the present invention.
Figure 6:
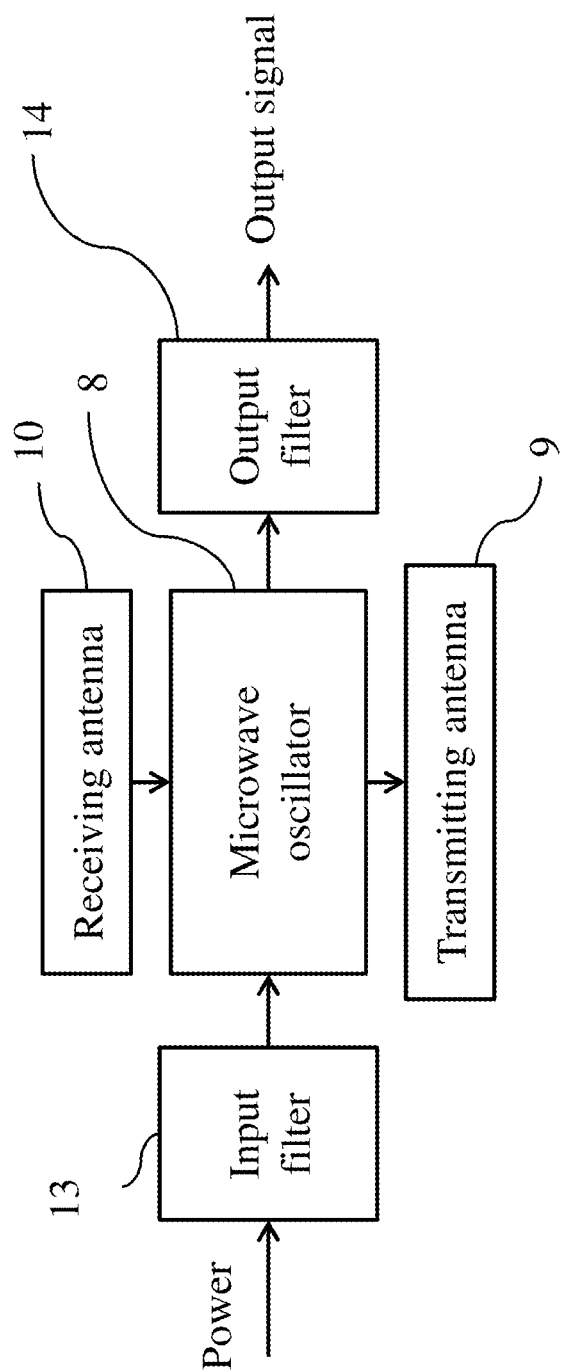
FIG. 6 is a block diagram of a radar transmitting and receiving sensor system according to one embodiment of the present invention.

Aspects of embodiments of the present invention relate to a directional radar transmitting and receiving system that transmits and receives radar signals, reduces or avoids false triggering, and provides stability and adapts to different environments. In some embodiments, the directional radar transmitting and receiving system may include a sensor circuit board and a main control board. The sensor circuit board may include a non-conductive substrate integrated with a microwave oscillator, a transmitting antenna and a receiving antenna. The main control board may include a signal amplifying circuit, a main control chip and a switch circuit. The transmitting antenna transmits a high-frequency microwave signal, while the receiving antenna receives the frequency-shifted reflection of the transmitted microwave signal. A pulse wave signal is formed by applying frequency mixing and wave detection techniques to the frequency-shifted signal, and output to the signal amplifying circuit for processing. The main control chip performs pulse wave analysis on the output signal of the signal amplifying circuit. The main control chip also controls the operation of the switch circuit, which activates the load appliances when the pulse wave analysis meets a triggering condition.

In some embodiments, the main control chip may include a software control module. The software control module evaluates the pulse wave signal that is output by the sensor circuit board, determines whether the pulse wave meets the triggering condition. In some aspects, the evaluation of the triggering condition may include: 1. evaluate the width and amplitude of the pulse wave signal to determine whether the pulse wave signal is a clutter signal generated by the movement of a small object; if it is a clutter signal generated by the movement of a small object and it is confirmed that the pulse wave signal currently output by the sensor circuit board is a pulse wave signal that does not meet the triggering condition, return and monitor the next pulse wave signal from the sensor circuit board; and 2. Compare the shape of the pulse wave signal output by the sensor circuit board with the pre-stored default triggering signal shape, and if the pulse wave signal does not match the pre-stored default triggering signal shape and is thus identified as a noise signal, which means the pulse wave signal output by the sensor circuit board is a pulse wave signal that does not meet the triggering condition, the software control module will monitor the next pulse wave signal from the sensor circuit board.

In some embodiments, the evaluation may include: 3. determine whether the pulse wave signal output by the sensor circuit board is a noise signal of the power supply (e.g., 50 Hz or 60 Hz mains hum), which does not meet the triggering condition, thereby the software control module return and monitor the next pulse wave signal from the sensor circuit board.

In some embodiments, the evaluation steps may include: 4. determine whether the voltage value of the pulse wave signal output by the sensor circuit board reaches a preset threshold value. In some embodiments, the pulse wave signal must reach the threshold value to meet the triggering condition. If the software control module determines that the present pulse wave signal does not meet the threshold, it will return and monitor the next pulse wave signal from the sensor circuit board.

In some embodiments, when the pulse wave signal output by the sensor circuit board is determined to meet or satisfy the triggering condition, e.g., satisfies evaluation steps 1, 2, 3 and 4, above, the evaluation steps may further include: 5. determine the number of pulse wave signals that meet the triggering condition during a period of time. The main control chip will only control the operation of the switch circuit to activate the load appliances when a minimum number of pulse wave signals meeting the triggering conditions are continuously (e.g., sequentially) detected within a time period. If the number of detected qualifying pulse wave signals within a period of time does not reach the threshold, the load appliance (or appliances) will not be activated and the software control module will continue to monitor the next pulse wave signal from the sensor circuit board.

In various embodiments, the evaluation steps 1, 2, 3 and 4 can be executed in any combination and in any order.

In some embodiments, the evaluation steps 1, 2, 3 and 4 are processed according to a particular order. For example, beginning with step 4, proceed to step 3, then proceed to step 1, and finally to step 2.

In some embodiments, the determination of whether the pulse wave signal output by the sensor circuit board is a noise signal of the power supply may be achieved by comparing the frequency of the pulse wave signal with the frequency of the mains power source connected to the power supply. In some aspects of embodiments of the present invention, if the pulse wave signal output by the sensor circuit board is consistent with the frequency of the mains power source, it is regarded as a noise signal of the power supply.

In some embodiments, a shielding board is configured to direct signals toward the sensor circuit board.

In some embodiments, the microwave oscillator may include a RC oscillator circuit, a transistor, a first filter circuit configured to receive input signals, and a second filter circuit configured to receive output signals. In some embodiments, the RC oscillator circuit may include a plurality of capacitors that are connected in parallel and connected to a transmitting antenna. In some aspects, one end of the capacitors is connected to ground while the other end is connected to the input power and the transmitting antenna. In some embodiments, the transmitting antenna is connected to the transistor at its collector side and the input power is connected to the base of the transistor through the first filter circuit. The emitter of the transistor, however, is connected to one end of the receiving antenna while the other end of the receiving antenna outputs a signal through the second filter circuit. In some embodiments, the directional radar transmitting and receiving system may include a non-conductive substrate. In some aspects, the non-conductive substrate may be integrated with an anti-coupling copper foil to further attenuate or eliminate interfering signals. In some aspects, one end of the anti-coupling copper foil is connected to the base of the transistor, and the other end of the anti-coupling copper foil is floating.

In some embodiments, an RC filter circuit is adopted for the first filter circuit and the second filter circuit, wherein the RC filter circuit is configured to attenuate or eliminate interfering signals.

In some aspects, a first copper wire is laid along (e.g. adjacent) the edge or edges of the non-conductive substrate (e.g., along one edge, along two adjacent edges, along three edges, or along four edges of the non-conductive substrate). In some aspects, the non-conductive substrate is provided with a plurality of first recesses distributed at intervals along the first copper wire (e.g., along the edge or edges of the non-conductive substrate). In some aspects, plurality of first copper pillars are embedded in the plurality of the first recesses, where the first copper wire electrically connects the plurality of first copper pillars to form a transmitting antenna. In some aspects, the non-conductive substrate is provided with plurality of second recesses distributed at intervals along the second copper wire (e.g., in a central portion of the non-conductive substrate). In some aspects, plurality of second copper pillars are embedded in the plurality of the second recesses, where the second copper wire electrically connects the plurality of second copper pillars to form a receiving antenna. In some aspects, the first copper wire is configured in a frame-shaped closed loop, and the second copper wire is arranged in a central portion of the frame-shaped closed loop formed by the first copper wire.

In some embodiments, the main control chip on the main control board may be connected to a configuration switch (e.g., a dual in-line package or DIP switch). In some aspects, the software control module sets parameters according to the status of the configuration switch. For example. the software control module may set the following three parameters according to the status of the configuration switch: sensing distance of the sensor circuit board, delay time to turn on (e.g., supply power to) the load appliances, and the light control mode (e.g., controlling the lighting based on whether it is currently daylight, as determined by a measurement from a light sensor, such as turning on a light when motion is detected when the light sensor measures an ambient luminance of less than 30 lux, but not turning on the light if the light sensor measures an ambient luminance of more than 30 lux).

According to one embodiment of the present invention, the main control chip is provided with a software control module that evaluates the pulse wave signal output by the sensor circuit board and determines whether the pulse wave signal meets a triggering condition. The evaluation may include determining the width and amplitude of the pulse wave signal, so as to confirm whether the pulse wave signal is a noise signal generated by the movement of a small object (based on the theory that the amplitude of a signal generated by the movement of a small object is too small to cause triggering). The evaluation steps may also include comparing the shape of the pulse wave signal output by the sensor circuit board with a pre-stored default triggering signal shape, and if the pulse wave signal does not match the pre-stored default triggering signal shape, the signal is thus identified as a noise signal. These steps contribute to excluding interference signals, avoiding false triggering, and improving reliability and practicality.

According to one embodiment of the present invention, the software control module may execute additional evaluation steps that further reduce or eliminate interference signals. In one aspect, the steps may further include determining whether the pulse wave signal output by the sensor circuit board is a noise signal caused by the power supply. In one aspect, the steps may include determining whether the voltage value of the pulse wave signal output by the sensor circuit board reaches a threshold value (e.g., a preset or predetermined threshold value).

In some embodiments, when the pulse wave signal output by the sensor circuit board is determined to meet the triggering condition, the evaluation steps may further include determining the number of pulse wave signals that meet the triggering condition during a period of time. The main control chip will control the operation of the switch circuit to activate the load appliances when a minimum number of pulse wave signals meeting the triggering conditions are continuously (e.g., sequentially) detected within a time period. If the number of detected qualifying pulse wave signals within a period of time does not reach the threshold, the load appliances will not be activated and the software control module will return and monitor the next pulse wave signal from the sensor circuit board.

According to some embodiments, the evaluation steps may be executed in any combination and in any order.

According to some embodiments, the microwave oscillator may include an RC oscillator circuit, a transistor, a first filter circuit configured to receive input signals, and a second filter circuit configured to receive output signals. In some aspects, the RC oscillator circuit may include a plurality of capacitors that are connected in parallel to a transmitting antenna. In some aspects, the transmitting antenna is connected to the transistor at its collector terminal and the input power is connected to the base of the transistor through the first filter circuit. The emitter of the transistor is connected to one end of the receiving antenna while the other end of the receiving antenna outputs a signal through the second filter circuit. In some embodiments, the directional radar transmitting and receiving system may include a non-conductive substrate. In some aspects, the non-conductive substrate may be integrated with an anti-coupling copper foil to further eliminate interfering signals. In some aspects, one end of the anti-coupling copper foil is connected to the base of the transistor, and the other end of the anti-coupling copper foil is floating.

According to some embodiments, to further eliminating interfering signals, a RC filter circuit is adopted for the first filter circuit and filter circuit.

According to some embodiments, to improve receiving antenna sensitivity, a first copper wire is laid along (e.g. adjacent) the edge or edges of the non-conductive substrate. In some aspects, the non-conductive substrate is provided with a plurality of first recesses distributed at intervals along the first copper wire (e.g., along the edge or edges of the non-conductive substrate). In some aspects, plurality of first copper pillars are embedded in the plurality of the first recesses, where the first copper wire electrically connects the plurality of first copper pillars to form a transmitting antenna. In some aspects, the non-conductive substrate is provided with plurality of second recesses distributed at intervals along a second copper wire (e.g., in a central portion of the non-conductive substrate). In some aspects, plurality of second copper pillars are embedded in the plurality of the second recesses where the second copper wire electrically connects the plurality of second copper pillars to form a receiving antenna. In some aspects, the first copper wire that is configured in a frame-shaped closed loop, and the second copper wire is arranged in a central portion of the frame-shaped closed loop formed by the first copper wire.

According to some embodiment, to reduce cost and provide practicality, the main control chip is connected to a configuration switch (e.g., a dual in-line package or DIP switch), which the software control module sets parameters according to the status of the configuration switch.

According to some embodiment, to provide improved or optimal results in reducing or eliminating noise signal and improving software processing speed, the software control module may execute the evaluation steps according to an order (e.g., a predetermined order).

Aspects of embodiments of the present invention relate to a directional radar transmitting and receiving system. Aspects of the present invention will be described in more detail using the following examples, which may describe more than one relevant embodiment falling within the scope of the present invention.

As shown in FIGS. 1, 2, 3, 4, 5, 6, 7, 8 and 9, the directional radar transmitting and receiving system may include includes a sensor circuit board 1 integrated with a microwave oscillator 8, a transmitting antenna 9, and a receiving antenna 10. A first wire (e.g., a first copper wire) 2 and a second wire (e.g., a second copper wire) 3 are laid on the sensor circuit board 1 and used as the transmitting antenna 9 and the receiving antenna 10 respectively. The transmitting antenna 9 is configured to transmit a high-frequency microwave signal into an environment (e.g., a room), while the receiving antenna 10 receives the high-frequency microwave signal as reflected back from the environment. In some aspects, a shielding board 4 is mounted on one side of the main control board 7. The shielding board 4 and the transmitting antenna/receiving antenna are on the two (e.g., opposite) sides (or faces) of the sensor circuit board 1, wherein the shielding board 4 is made of metal and directs the transmitting antenna 9 to transmit directional high-frequency microwave signals (e.g., by reflecting signals emitted by the transmitting antenna 9). In some embodiments of the present invention, the main control board 7 is between the sensor circuit board 1 and the shielding board 4. Additionally, the shielding board 4 directs the receiving antenna 10 to receive the frequency-shifted signals that are reflected back.

In some embodiments, the sensor circuit board 1 includes a non-conductive substrate that is provided with a plurality of first recesses 11, distributed at intervals along the first copper wire 2 of the transmitting antenna (e.g., along the edges of the board, where the first copper wire 2 is disposed). A plurality of first electrically conductive pillars (e.g., first copper pillars) 5 are embedded in the first recesses 11. A first copper wire 2 electrically connects these first copper pillars 5 so that the first copper wire 2 and the first copper pillars 5 are combined to strengthen the high-frequency microwave signal transmitted by the transmitting antenna.

In some embodiments, a first copper wire 2 is laid along the edge of the non-conductive substrate of the sensor circuit board 1. The non-conductive substrate is provided with a plurality of first recesses 11 distributed at intervals along the first copper wire 2 (e.g., along the edge of the non-conductive substrate). In some aspects, a plurality of first copper pillars 5 (or electrically conductive pillars) is embedded in the first recesses 11. In some embodiments, the first copper wire 2 electrically connects the plurality of first copper pillars 5 to form a transmitting antenna 9.

In some aspects, the non-conductive substrate of the sensor circuit board 1 may include a second copper wire 3 that is arranged in a central portion of (e.g., the middle of) a frame-shaped closed loop formed by the first copper wire 2. The non-conductive substrate of the sensor circuit board 1 may be provided with a plurality of second recesses 12 distributed at intervals along the second copper wire 3. In some aspects, a plurality of second copper pillars 6 are embedded in the second recesses 12. The second copper wire 3 electrically connects a plurality of second copper pillars 6 to form a receiving antenna 10. The second copper pillars 6 increase the sensitivity of the receiving antenna 10 (e.g., increase sensitivity over a receiving antenna that contained only the second copper wire, without the second copper pillars 6) in detecting the frequency-shifted signal reflected back from the environment.

In some aspects, the first copper wire 2 that is laid on the edge of the non-conductive substrate of the sensor circuit board 1 forms a frame-shaped closed loop, and the first copper wire 2 is configured to have a square-shape.

In some aspects, the second copper wire 3 is arranged in the middle of (enclosed within) the frame-shaped closed loop formed by the first copper wire 2.

In some embodiments, the second copper wire 3 is in an S shape. In some embodiments, the second copper wire 3 is in an U shape.

In some embodiments, a main control board 7 is mounted on one side of the shielding board 4, and the main control board 7 and the sensor circuit board 1 are located at the same side of the shielding board 4. In some embodiments of the present invention, the main control board 7 is between the sensor circuit board 1 and the shielding board 4. In some embodiments, the shielding board includes metal (e.g., is made of metal) and a non-conductive film is mounted on a face of the shielding board facing the main control board, and, in some embodiments, the non-conductive film contacts the main control board. In one embodiment, the main control board 7 is arranged with a power supply circuit 20 (e.g., connected to a mains power source and configured to supply power to the sensor circuit board 1 and to other components of the main control board 7), a signal amplifying circuit 16, a main control chip 17, and a switch circuit 18.

In some embodiments, the first copper wire 2 and the second copper wire 3 are laid on the sensor circuit board 1 and used as the transmitting antenna 9 and the receiving antenna 10 respectively. The transmitting antenna 9 transmits the high-frequency microwave signal, while the receiving antenna 10 receives the frequency-shifted reflection of the transmitted microwave from the environment. The shielding board 4 is mounted on one side of the main control board 7. The shielding board 4 and the first copper wire 2 and the second copper wire 3 are on the two opposite sides of the sensor circuit board 1. In some embodiments of the present invention, the main control board 7 is between the sensor circuit board 1 and the shielding board 4. The first copper wire 2 and the second copper wire 3 are used as the transmitting antenna 9 and the receiving antenna 10 respectively. During operation, the shielding board 4 directs the signals emitted by the transmitting antenna 9 to form directional high-frequency microwave signals (e.g., a directional antenna pattern). In some embodiments, the shielding board 4 includes metal (e.g., may be made of metal) and directs high-frequency microwave signals to create a directional receiving antenna, improving or optimizing the use of directional transmitting and directional receiving of radar signals, reducing or avoiding false triggering, improving stability, and adapting to many kinds of application environments.

According to one embodiment as shown in FIGS. 6, 7, 8, and 9, the sensor circuit board 1 includes a non-conductive substrate that is integrated with microwave oscillator 8. In one aspect, the microwave oscillator 8 may include a RC oscillator circuit 15, a transistor Q1, a first filter circuit 13 configured to receive input signals, a second filter circuit 14 configured to receive output signals, and a receiving antenna 10. In some aspects, the RC oscillator circuit 15 may include a plurality of capacitors that are connected in parallel and connected to a transmitting antenna 9. In some aspects, one end of the capacitors is connected to ground while the other end is connected to the input power Vcc and the transmitting antenna 9. In some embodiments, the transmitting antenna 9 is connected to the transistor Q1 at its collector side and the input power is connected to the base of the transistor Q1 through the first filter circuit 13. The emitter of the transistor Q1, however, is connected to one end of the receiving antenna 10 while the other end of the receiving antenna 10 outputs a signal through the second filter circuit 14.

In some embodiments, the non-conductive substrate of the sensor circuit board 1 may be integrated with an anti-coupling copper foil PAD. In some aspects, one end of the anti-coupling copper foil is connected to the base of the transistor Q1, and the other end of the anti-coupling copper foil is floating.

In some embodiments, the anti-coupling copper foil is shaped as a rectangle, with a length more than 6.5 mm, a width more than 2.5 mm, and an aspect ratio of 1.5:1 to 3:1.

In some aspects, the RC oscillator circuit 15 includes a capacitor C1, a capacitor C2, a capacitor C3 and a capacitor C4. In some aspects, capacitor C2 is an no-connect capacitor and capacitors C1, C3 and C4 are chip capacitors (e.g. ceramic chip capacitors). In some aspects, capacitors C1, C3 and C4 are X7R or X5R 0.5 pF chip capacitors. And the RC filter circuit is adopted for the first filter circuit and the second filter circuit.

Figure 7:
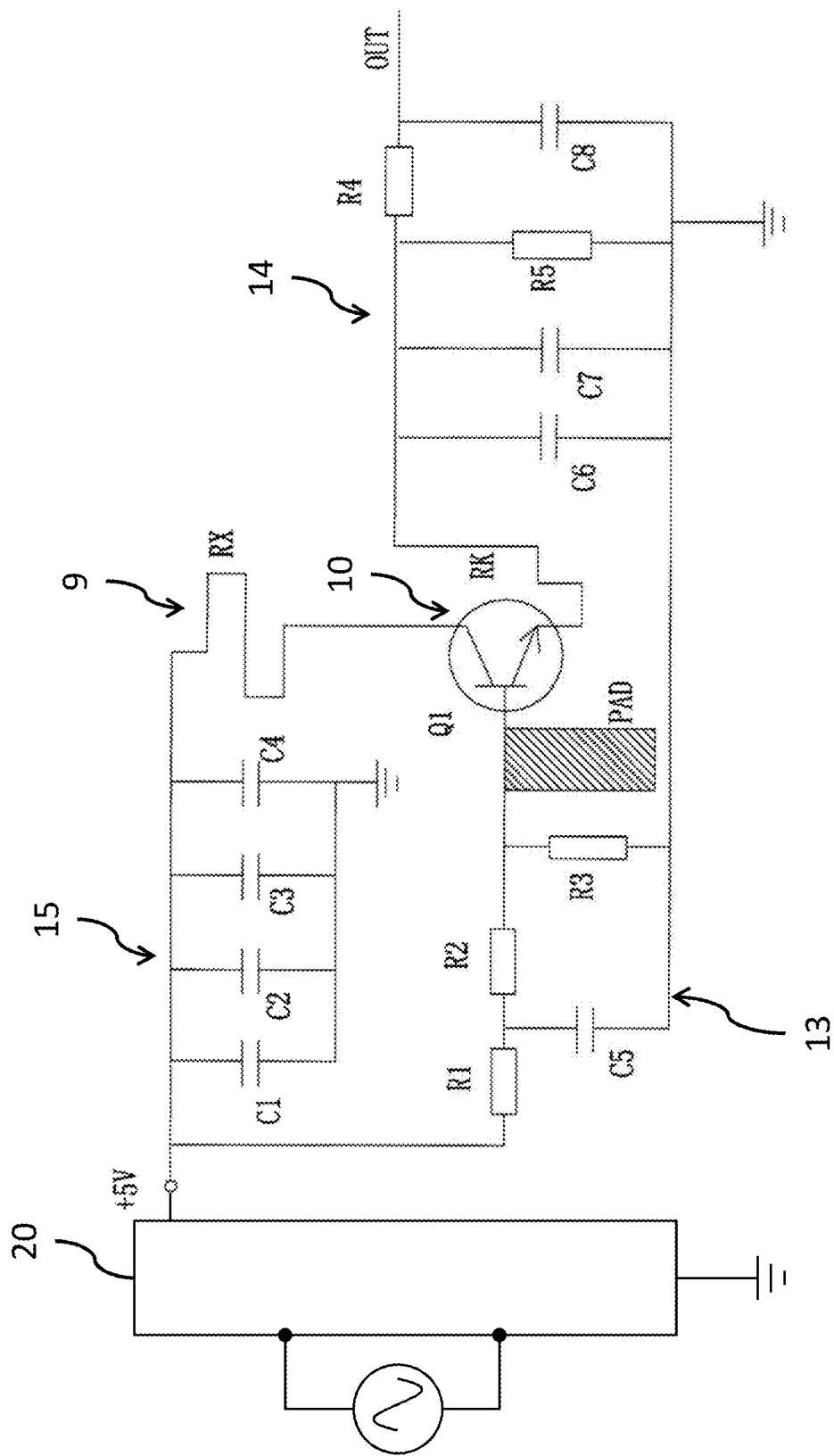
FIG. 7 is a circuit diagram of a radar transmitting and receiving sensor according to one embodiment of the present invention.
Figure 8:
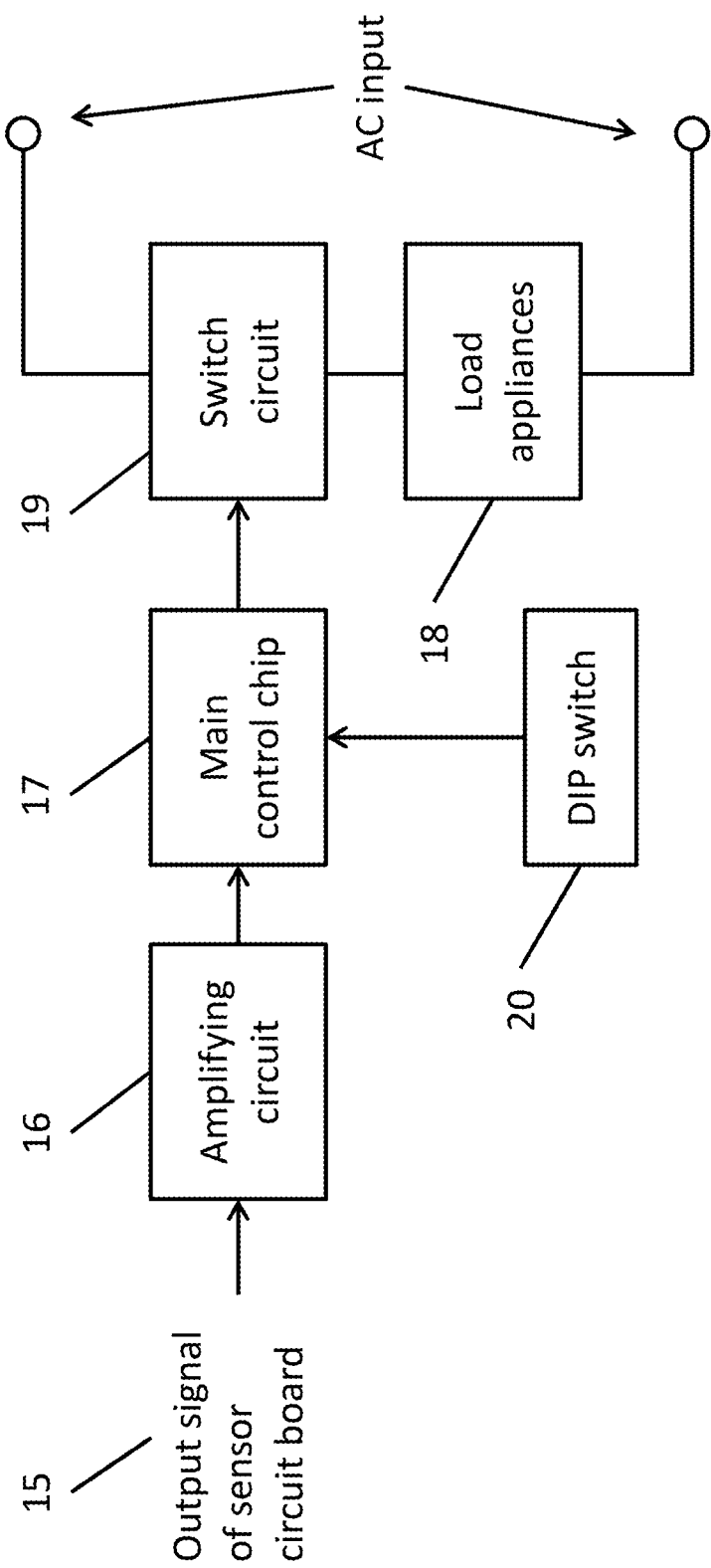
FIG. 8 is a block diagram of a main control system according to one embodiment of the present invention.
Figure 9:
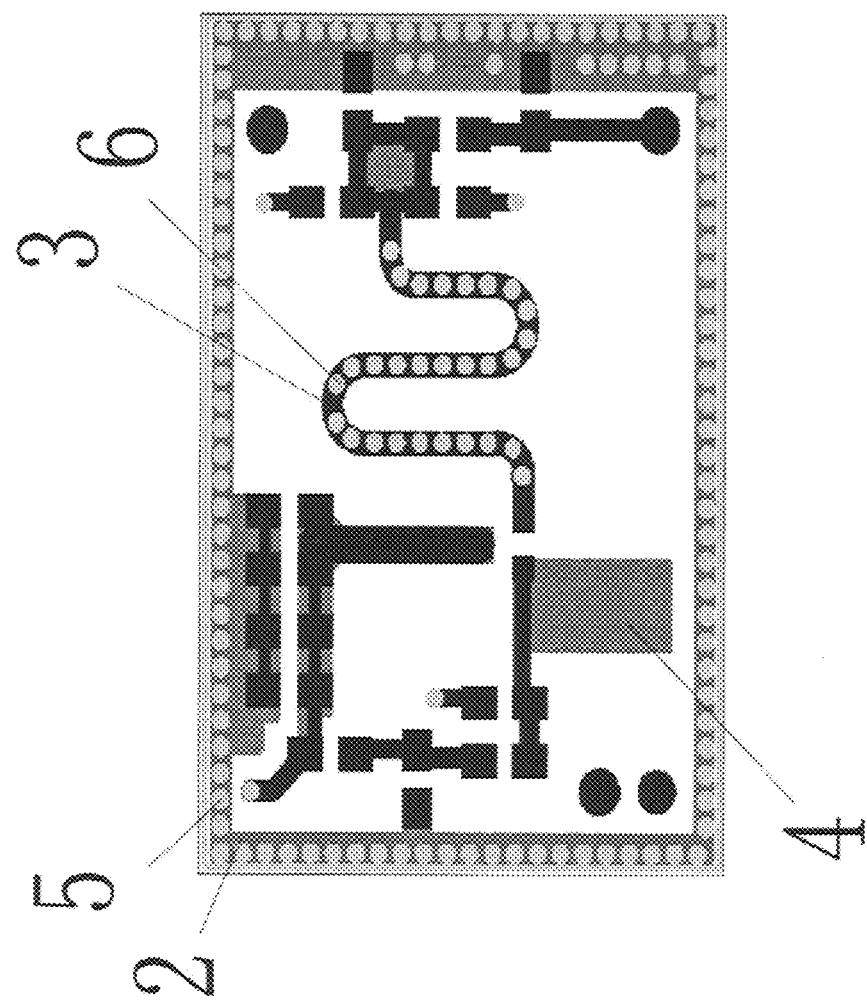
FIG. 9 is a wiring plan view of a radar transmitting and receiving sensor circuit board according to one embodiment of the present invention.
Figure 10:
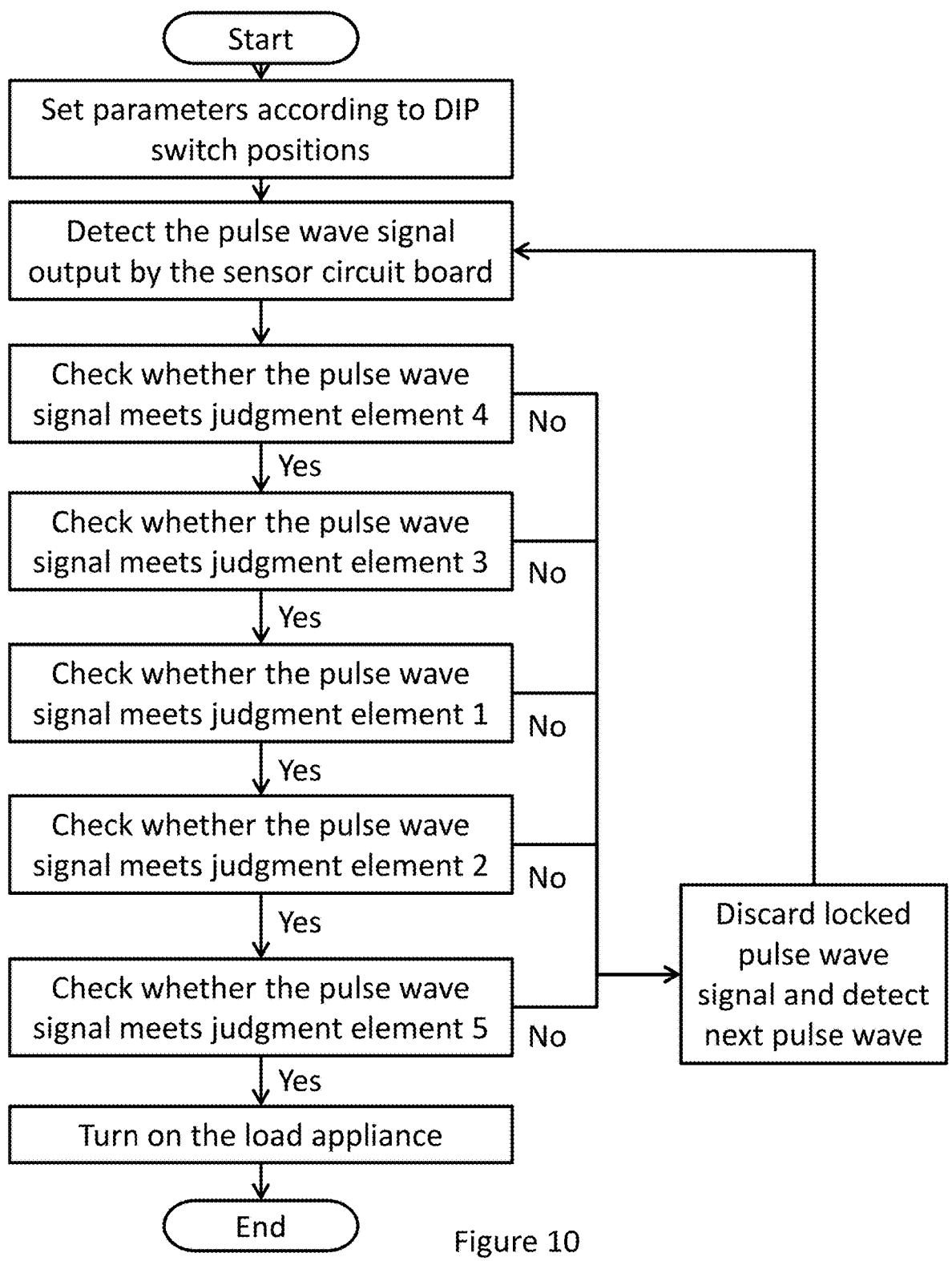
FIG. 10 is a flowchart of a method for controlling an electrical appliance according to one embodiment of the present invention.

According to an embodiment of the present invention shown in FIG. 7, the first filter circuit 13 may include a first resistor R1, a second resistor R2, a third resistor R3 and a fifth capacitor C5. Accordingly, the second filter circuit 14 may include a sixth capacitor C6, a seventh capacitor C7, an eighth capacitor C8, a fourth resistor R4, and a fifth resistor R5. The RC oscillator 15 may include a number of capacitors: a first capacitor C1, a second capacitor C2, a third capacitor C3, a fourth capacitor C4, and a transmitting antenna RX. The collector of the transistor Q1 may be connected to anti-coupling copper foil (labeled "PAD" in FIG. 7). Accordingly, the emitter of the transistor Q1 is connected to the receiving antenna RK and the other end of the receiving antenna RK is connected to the output filter circuit 14.

In some embodiments, during operation, a high-frequency microwave signal of about 5.8 GHz is transmitted by the microwave oscillator 8 of the sensor circuit board 1 and is transmitted out into an environment (e.g., a room) by the transmitting antenna 9 (a combination of first copper wire 2 and first copper pillars 5) distributed around the sensor circuit board 1 (e.g., located at the edges of the sensor circuit board). The S-shaped (or, in some embodiments, U-shaped, although embodiments of the present invention are not limited to S-shaped and U-shaped antennas) receiving antenna 10 (a combination of the second copper wire 3 and the second copper pillars 6) receives the frequency-shifted signal reflection of the transmitted microwave due to triggering events, such as the movement of humans, cars and other large objects in the environment. Through frequency mixing and wave detection and other operations applied to the signal, the signal is output to the signal amplifying circuit 16 and then is connected to the main control chip 17 for analysis. The main control board 7 controls the operation of the switch circuit 18, so as to control the turning on of the load appliances.

According to one embodiment as shown in FIGS. 1-10, the directional radar transmitting and receiving system may include a sensor circuit board 1 and a main control board 7. In some aspects, the sensor circuit board 1 includes a microwave oscillator 8, a transmitting antenna 9 and a receiving antenna 10. Additionally, the main control board 7 is integrated with a signal amplifying circuit 16, a main control chip 17 and a switch circuit 18. In some aspects, the microwave oscillator 8 transmits a high-frequency microwave through the transmitting antenna 9; the integrated receiving antenna 10 on the sensor circuit board 1 receives the frequency-shifted signal reflected back from the environment. The received frequency-shifted signal is sent for further processing, including frequency mixing and wave detection. The system outputs a pulse wave signal to the signal amplifying circuit 16 that is on the main control board 7. After processing by the signal amplifying circuit 16, the signal is sent to the main control chip 17 for pulse wave analysis. Based on the analysis result, the main control chip 17 activates the switch circuit 18, which turns on (e.g., supplies mains power to) the load appliances 19. In some aspects, the main control chip 17 is provided with a software control module configured to execute multiple evaluation processes that determine whether the pulse wave signal output by the sensor circuit board 1 is a pulse wave signal that meets the triggering condition based on whether each of the evaluation processes is satisfied. In some aspects, the triggering condition may include a first evaluation process 1. determine the width and amplitude of the pulse wave signal and confirm whether the pulse wave signal is a noise signal generated by the movement of a small object. The amplitude of a signal generated by the movement of a small object is too small to cause triggering (e.g., below a threshold amplitude). If it is a noise signal generated by the movement of a small object and it is confirmed that the pulse wave signal currently output by the sensor circuit board is a pulse wave signal that does not meet the triggering condition, the software control module returns and monitors the next pulse wave signal from the sensor circuit board. In some aspects, the evaluation process may also include a second evaluation process 2. compare the shape of the pulse wave signal currently output by the sensor circuit board with the pre-stored default triggering signal shape, and if the pulse wave signal does not match the pre-stored default triggering signal shape, the signal is thus identified as a noise signal. When it is determined that the pulse wave signal currently output by the sensor circuit board is a pulse wave signal that does not meet the triggering condition, the software control module returns and monitors the next pulse wave signal from the sensor circuit board.

Figure 11:
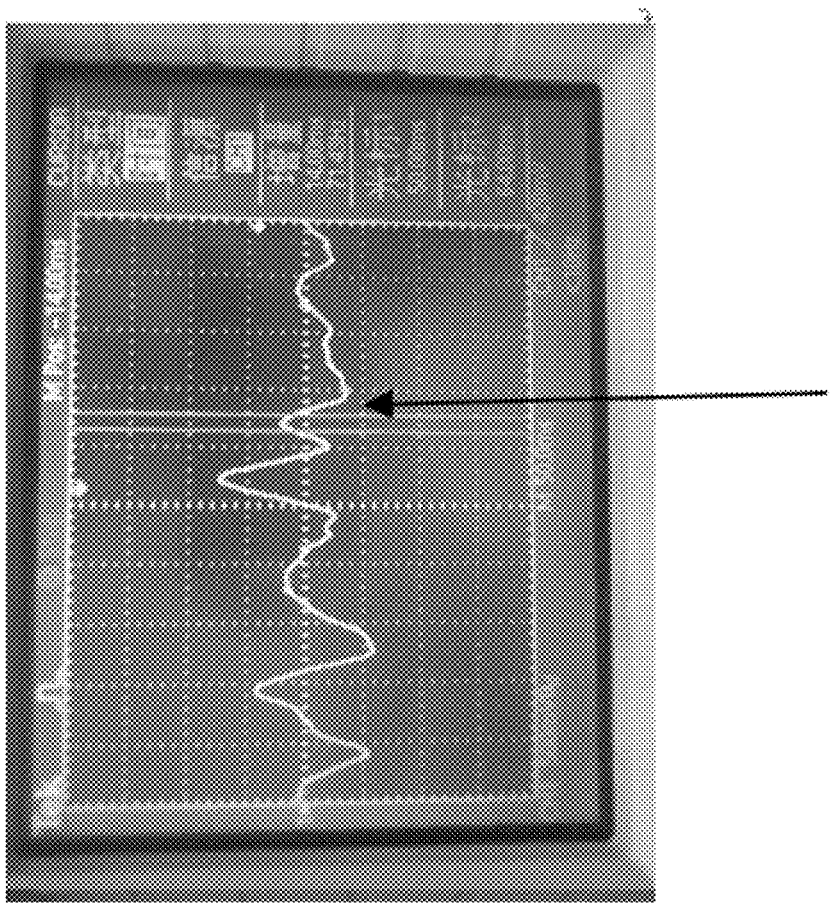
FIG. 11 is a waveform of a noise signal generated by the movement of a small object detected by the radar system according to one embodiment of the present invention.

In some embodiments of the present invention, in operation, evaluation process step 1 may begin by setting a threshold value H1 for the width of the pulse wave signal in the program, for example, H1=30 ms (milliseconds); if the width of the pulse wave signal currently output by the sensor circuit board is smaller than the threshold value H1, it is determined that the pulse wave signal is a noise signal generated by the movement of a small object, which can be excluded to avoid false triggering. As shown in FIG. 11, when the width of the pulse wave signal currently output by the sensor circuit board and measured by the oscilloscope is 15 ms (milliseconds), the pulse wave signal currently output by the sensor circuit board does not meet the requirement, the evaluation process discards the current pulse wave signal and returns and monitors the next pulse wave signal from the sensor circuit board 1.

Figure 12:
FIG. 12 is a waveform of the pre-stored default triggering signal detected by the radar system according to one embodiment of the present invention.
Figure 13:
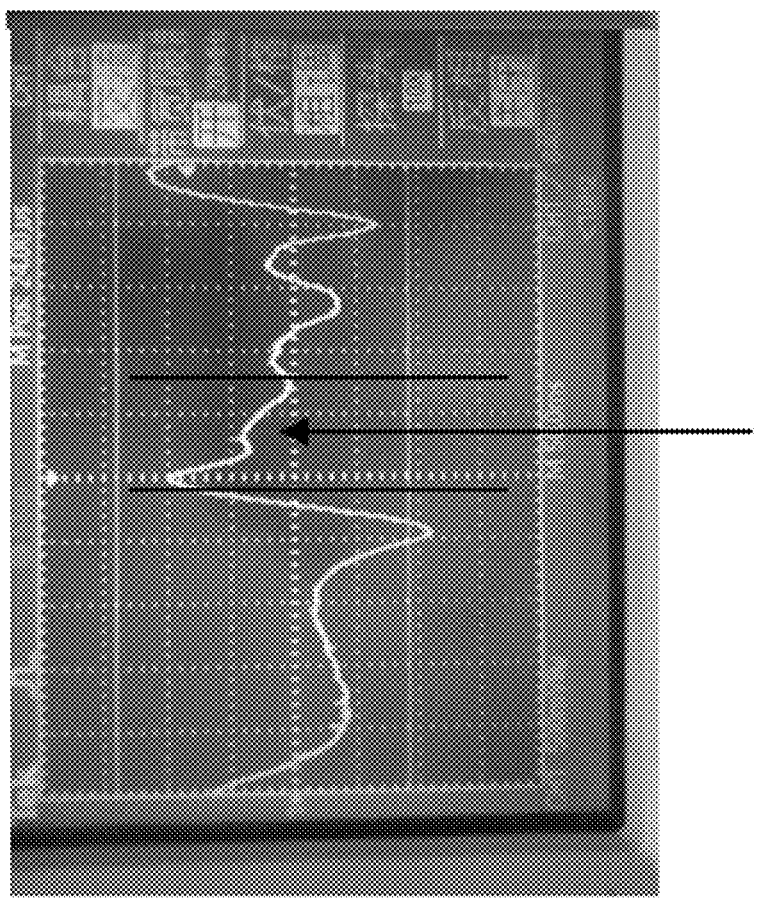
FIG. 13 is a waveform of an abnormal triggering signal (noise signal) according to one embodiment of the present invention.
Figure 14:
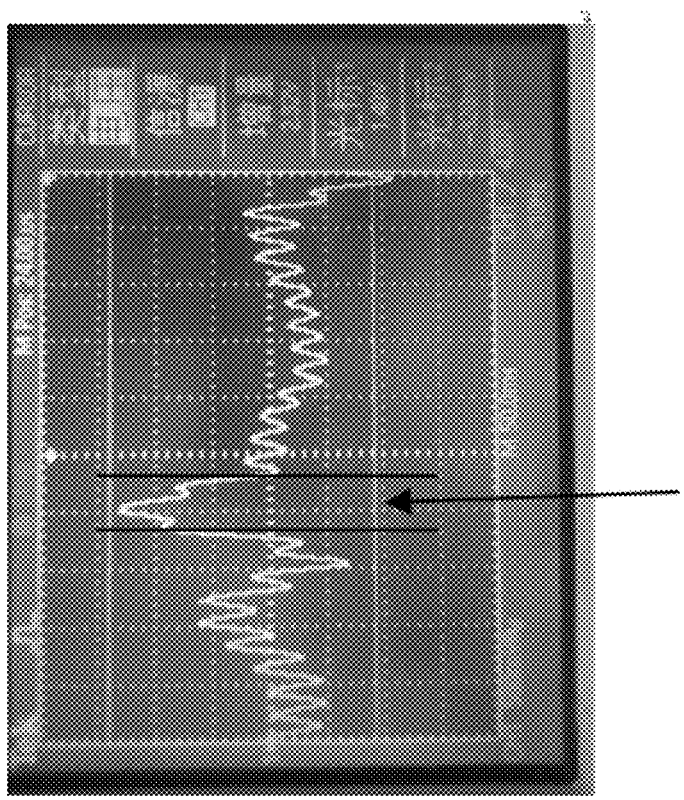
FIG. 14 is a waveform of another abnormal triggering signal (noise signal) according to one embodiment of the present invention.

Accordingly, the second evaluation process step 2 is configured with a pre-measured triggering signal that satisfies or meets the second evaluation process. The pre-measured triggering signal is then saved in the main control chip 17 as a pre-stored default triggering signal. As shown in FIG. 12, the shape of the pulse wave signal currently output by the sensor circuit board 1 is compared with the pre-stored default triggering signal shape, and if the pulse wave signal does not match the pre-stored default triggering signal shape, it will be determined as noise signal. As the examples shown in FIGS. 13 and 14, two abnormal triggering waveforms are being determined as noise signals, which may be caused by an object enters the sensing range and immediately exits, or a small animal moves slowly in the sensing range, etc. If a pulse wave signal currently output by the sensor circuit board is determined to be a pulse wave signal that does not meet the triggering condition, the evaluation process returns and monitors the next pulse wave signal from the sensor circuit board.

Figure 15:
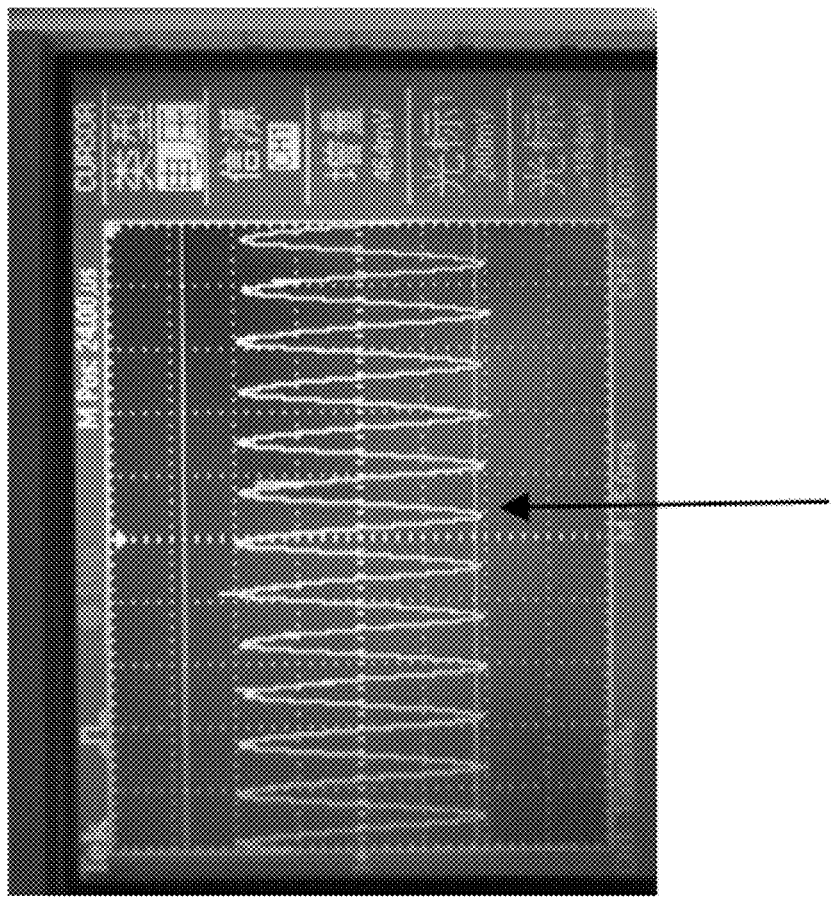
FIG. 15 is a waveform of a noise signal of the power supply according to one embodiment of the present invention.

Accordingly, the evaluation process may further include step 3: compare the frequency of the pulse wave signal currently output by the sensor circuit board to the frequency of the power supply. If the frequency of said pulse wave signal is similar to the frequency of the power supply, it is determined as a noise signal of the power supply. In the case of a noise signal of the power supply, the pulse wave signal currently output by the sensor circuit board is categorized as a pulse wave signal that does not meet the triggering condition, the evaluation process returns and monitors the next pulse wave signal from the sensor circuit board. According to an example as shown in FIG. 15, a pulse wave signal currently output by the sensor circuit board that has the frequency of 50 Hz is determined to be power supply noise because the frequency of the power supply is 50 Hz. (Similarly, in environments where the frequency of the power supply is 60 Hz, then a pulse wave signal having a frequency of 60 Hz would be determined to be power supply noise.) On the other hand, if the frequency of the pulse wave signal is dissimilar with the frequency of the power supply (e.g., greater than 10% difference in frequency), then the third evaluation process is determined to be satisfied.

In some embodiments, the evaluation process may further include step 4. determining whether the voltage value of the pulse wave signal currently output by the sensor circuit board 1 reaches a threshold value (e.g., a preset threshold value). If it does not reach the threshold value, and it is determined that the pulse wave signal currently output by the sensor circuit board is a pulse wave signal that does not meet the triggering condition, the evaluation process returns and monitors the next pulse wave signal from the sensor circuit board 1. According to some embodiments, the waves found through detection by the sensor circuit board 1 are output as voltage waveforms. For example, when the threshold value set in the program is 100 mV, if the voltage waveform output from the sensor circuit board 1 is greater than this value, the program will start detecting the pulse wave.

According to some embodiments, when the pulse wave signal currently output by the sensor circuit board satisfies evaluation steps 1, 2, 3 and 4, the pulse wave signal currently output by the sensor circuit board 1 is regarded as a pulse wave signal that meets the triggering condition. Upon determining the triggering condition has been met, the evaluation process moves to step 5, determine whether a certain number of pulse wave signals meeting the triggering conditions are continuously detected within a time period. Based on the result of the evaluation step 5, the main control chip 17 that controls the operation of the switch circuit may activate the switch circuit 18 and turn on (e.g., supply power to) the load appliances 19. If the threshold number of the pulse wave signal that meets the triggering condition is not reached, the system does not activate the load appliances 19 and the evaluation process returns and monitors the next pulse wave signal from the sensor circuit board 1.

According to one embodiment, the threshold number within a certain period of time refers to the number of pulse wave signals that meet the triggering condition found through detection during a period of 0.6 seconds (or within 1 second). Additionally, the number of pulse wave signals that meet the triggering condition depends on the detection distance. To reduce or avoid false triggering, the number of pulse wave signals that meet the triggering condition can be found through detection can increase with longer distances. However, because mis-triggering may occur when the number of pulse wave signals meeting the triggering condition is too high and the time period is too short, the detection distance and the number of pulse wave signals meeting the triggering conditions should be chosen carefully, such as in a balanced ratio. In some embodiments, the value set in the program is in the range of 2 to 4 pulse waves. During the detection process, a power supply noise signal will be discarded directly, in case of an unqualified pulse wave, the detection will last for 0.5 seconds, and re-count if there is no pulse wave.

According to some embodiments, evaluation steps 1, 2, 3 and 4 as described above can be executed in any combination and in any order.

According to some embodiment, evaluation steps 1, 2, 3 and 4 as described above are executed according to a pre-set order, for example, step 4→step 3→step 1→step 2.

Accordingly, a shielding board 4 is installed with one face (or one side) of the shielding board 4 facing both the main control board 7 and the sensor circuit board 1. The face of the shielding board 4 facing the main control board 7 and the sensor circuit board 1 may include a non-conductive film. The main control chip 17 on the main control board 7 is also connected to a configuration switch (e.g., a DIP switch), and the software control module sets parameters according to the status of the configuration switch.

According to some embodiments, the operation of the switch circuit 18 is controlled by the main control chip 17, which activates (e.g., supplies power to) the load appliances 19. The load appliance 19 may be an energy-saving lamp, and the switch circuit 18 may be a bidirectional thyristor. In some aspects, the software control module sets the following three parameters according to the status of the DIP switch: sensing distance of the sensor circuit board, delay time to turn on the load appliances, and the light control mode. The sensor circuit board sensing distance is achieved by setting the voltage value (e.g. 100 mV) of the waves found through detection by the sensor circuit board. Additionally, the delay time to turn on the load appliances refers to the delay time to turn on a lamp or other electrical devices.

Although aspects of embodiments of the present invention are described in detail with reference to the forgoing example embodiments, it should be understood by those of ordinary skill in the art that the technical solution described within reference to the foregoing example embodiments may be modified or equivalent replacements may be made to some of the technical features therein. It will also be apparent to the skilled artisan that the embodiments described above are specific examples of a single broader invention that may have greater scope than any of the singular descriptions without departing from the spirit and scope of the present invention.

What is claimed is:

1. A directional radar transmitting and receiving system comprising:
   a sensor circuit board comprising:
      a microwave oscillator;
      a transmitting antenna; and
      a receiving antenna; and
   a main control board comprising:
      a signal amplifying circuit;
      a switch circuit; and
      a main control chip configured to control the switch circuit;
   wherein the microwave oscillator of the sensor circuit board is configured to transmit a high-frequency microwave signal through the transmitting antenna,
   wherein the receiving antenna is configured to receive a frequency-shifted reflection of the high-frequency microwave signal transmitted through the transmitting antenna,
   wherein the microwave oscillator is configured to:
      apply frequency mixing and wave detection to the frequency-shifted reflection;
      generate a pulse wave signal;
      output the pulse wave signal to the signal amplifying circuit of the main control board; and
      output the pulse wave signal from the signal amplifying circuit to the main control chip,
   wherein the main control chip is configured to control the switch circuit, the switch circuit being configured to control a supply of power to one or more load appliances in accordance with a triggering condition, and
   wherein the main control chip stores a software control module in a non-transitory computer readable medium of the main control board, the software control module configuring the main control chip to determine whether the pulse wave signal output by the sensor circuit board meets the triggering condition wherein each of a plurality of evaluation processes is satisfied, the evaluation processes comprising:
      a first evaluation process comprising: determining whether a width and an amplitude of the pulse wave signal meets a threshold amplitude; and
      a second evaluation process comprising:
         comparing a shape of the pulse wave signal output by the sensor circuit board with a pre-stored default triggering signal shape; and
         determining that the second evaluation process is satisfied when the shape of the pulse wave signal matches the pre-stored default triggering signal shape.

2. The directional radar transmitting and receiving system of claim 1, wherein the evaluation processes further comprise a third evaluation process comprising:
   determining whether the frequency of the pulse wave signal output by the sensor circuit board is similar to the frequency of a power supply configured to supply power to the sensor circuit board; and determining that the third evaluation process is met when the frequency of the pulse wave signal is dissimilar to the frequency of the power supply.

3. The directional radar transmitting and receiving system of claim 2, wherein the evaluation processes further comprise a fourth evaluation process comprising: determining whether a voltage value of the pulse wave signal output by the sensor circuit board exceeds a threshold voltage value.

4. The directional radar transmitting and receiving system of claim 3, wherein: in response to determining that the pulse wave signal output by the sensor circuit board meets the first evaluation process, the second evaluation process, the third evaluation process, and the fourth evaluation process, the main control chip is configured to compute a fifth evaluation process comprising:
   receiving successive pulse wave signals during a time period; and
   determining that the fifth evaluation process is satisfied when at least a threshold number of the successive pulse wave signals received during the time period satisfy each of the evaluation processes,
   in response to determining that the fifth evaluation process is satisfied, the main control chip is configured to control the switch circuit.

5. The directional radar transmitting and receiving system of claim 4, wherein the evaluation processes are processed according to the following order:
   a. processing the fourth evaluation process;
   b. processing the third evaluation process;
   c. processing the first evaluation process; and
   d. processing the second evaluation process.

6. The directional radar transmitting and receiving system of claim 4, further comprising a shielding board configured to direct signals toward the sensor circuit board,
   wherein the transmitting antenna and the receiving antenna are a first face of the sensor circuit board, and
   wherein the shielding board faces a second face of the sensor circuit board, the second face being opposite the first face of the sensor circuit board.

7. The directional radar transmitting and receiving system of claim 6, wherein the microwave oscillator comprises:
   an RC oscillator circuit comprising a plurality of capacitors connected in parallel between a power supply and ground, a plurality of first ends of the capacitors connected to the power supply also being connected to a first end of the transmitting antenna;
   an input filter circuit connected between a base terminal of a transistor and the power supply;
   an output filter circuit connected to a first end of the receiving antenna;
   a transistor having:
      a collector terminal connected to a second end of the transmitting antenna;
      a base terminal connected to the power supply through the input filter circuit; and
      an emitter terminal connected to a second end of the receiving antenna;
   and
   an anti-coupling copper foil arranged on the sensor circuit board, the anti-coupling copper foil having a first end connected to the base terminal of the transistor and a second end floating.

8. The directional radar transmitting and receiving system of claim 7, wherein the determining whether the frequency of the pulse wave signal is similar to the frequency of the power supply comprises comparing the frequency of the pulse wave signal to a frequency of a mains power source connected to the power supply.

9. The directional radar transmitting and receiving system of claim 8, wherein the sensor circuit board has a plurality of first recesses distributed at intervals along at least one edge of a non-conductive substrate of the sensor circuit board,
   wherein the transmitting antenna comprises:
      a plurality of first copper pillars embedded in the first recesses; and
      a first copper wire electrically connecting the first copper pillars along the at least one edge of the non-conductive substrate of the sensor circuit board in the shape of a closed loop,
   wherein the sensor circuit board has a plurality of second recesses at a central portion of the non-conductive substrate of the sensor circuit board, and
   wherein the receiving antenna comprises:
      a plurality of second copper pillars embedded in the second recesses; and
      a second copper wire electrically connecting the second copper pillars, the second copper wire being located in a central portion of the non-conductive substrate of the sensor circuit board, the second copper wire being surrounded by the first copper wire.

10. The directional radar transmitting and receiving system of claim 6, wherein the main control chip is also connected to a configuration switch, and the software control module of the main control chip is configured to set parameters of the evaluation processes according to a status of the configuration switch.

11. The directional radar transmitting and receiving system of claim 10, wherein the parameters set according to the status of the configuration switch comprise:
   a sensing distance of the sensor circuit board;
   a delay time to turn on the load appliances; and
   a light control mode.

* * * * *